F. C. FEHRMAN.
BUFFER FOR AUTOMOBILES.
APPLICATION FILED SEPT. 22, 1911.
1,035,332.
Patented Aug. 13, 1912.
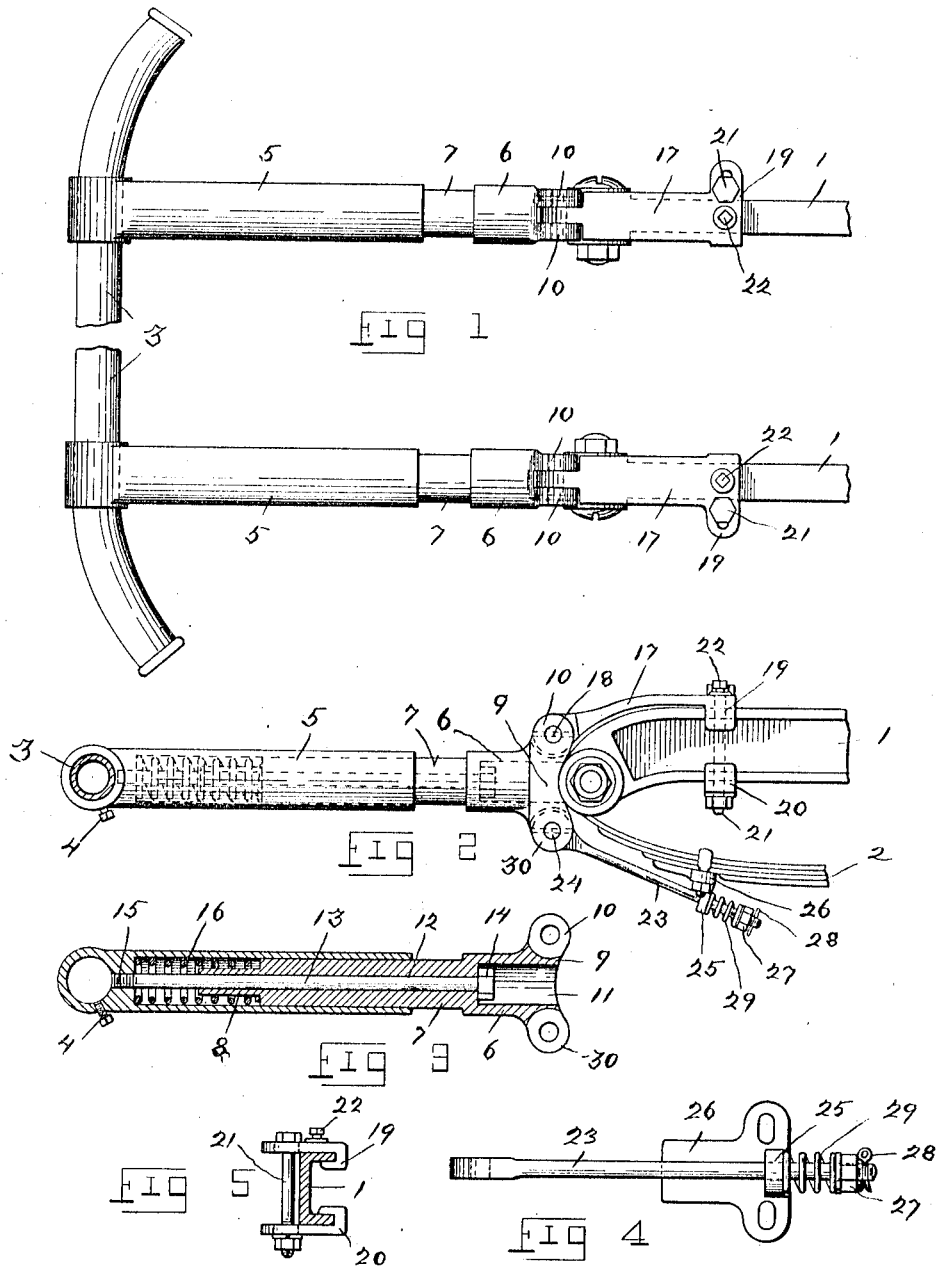
WITNESSES
B. P. Faltin
M. L. Lefevre
INVENTOR
Frederick C. Fehrman,
BY
John J. Thompson
ATTORNEY

UNITED STATES PATENT OFFICE.

FREDERICK C. FEHRMAN, OF GROFFS STORE, PENNSYLVANIA.

BUFFER FOR AUTOMOBILES.

1,035,332.	Specification of Letters Patent.	Patented Aug. 13, 1912.

Application filed September 22, 1911. Serial No. 650,677.

*To all whom it may concern:*

Be it known that I, FREDERICK C. FEHRMAN, a citizen of the United States, residing at Groffs Store, in the county of Lancaster and State of Pennsylvania, have invented certain new and useful Improvements in Buffers for Automobiles, of which the following is a specification, reference being had therein to the accompanying drawing.

This invention relates to a buffer for automobiles, and more particularly to the impact cushioning means and the means employed for securing the device to the vehicle.

While I am aware that there are numerous devices for this purpose they require special holes to be drilled through the frame of the vehicle in order to attach them thereto; and further, there are rarely any means provided to compensate for the spring movement of the vehicle.

The object of my invention is to provide a device of this class that may be readily attached to the vehicle without disturbing the construction of the same, and which shall also be simple, cheap and durable.

Another object of the invention is to provide means for compensating for the spring movement of the vehicle.

Still another object is to so construct the device that the cushion impact springs are concealed and adjustable attaching means are provided for securing the same to the vehicle.

With these and other objects in view, my invention consists in a certain construction and combination of parts as will hereinafter be fully described and claimed in the annexed specification, and illustrated in the accompanying drawings which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, is a top plan view of the device as applied to an automobile. Fig. 2, is a side elevation of the same. Fig. 3, is a longitudinal sectional view of the impact cushion means. Fig. 4, is a bottom plan view of a spring compensating device.

Fig. 5, is a front end view of the vehicle frame clamp.

Referring to the drawings, the channel frame of the automobile is indicated by the numeral 1, and the vehicle springs which are pivoted thereto by the numeral 2.

The buffer comprises the bumper bar 3, to which are secured the forward ends of the impact cushion members by the set screws 4.

The impact cushion members comprise the outer tubular member 5, secured to the bumper bar 3, as above stated, and the plunger 6, which is formed with the reduced portions 7, and 8. Said plunger 6 has a head, which is curved to conform to the end of the vehicle frame 1, said head being also provided with the bifurcated ear 10, and the orifice 11, communicating with the axial hole 12. Within said hole 12 is mounted a rod 13, formed with a head 14, contained within the orifice 11, and a threaded end 15, for securing the same to the outer end of the tubular member 5, for the purpose of preventing the withdrawal of the plunger member from the tubular member and also limiting its movement. For keeping the member in a normally extended position and providing a cushion means, the coil spring 16, is provided within the tubular member and embraces the reduced portion 8, of the plunger.

For clamping the device to the vehicle there is provided the arm 17, which is provided within the upper bifurcated ear 10, by the pin 18, and which is formed at its rear end with the U-shaped clamp 19, adapted to engage the vehicle channel frame 1, and co-operate with the U-clamp 20, which engages the lower part of the frame 1, and is secured to the clamp 19, by the bolt 21; said clamp 19, also being provided with a set screw 22, for engaging the frame 1, and preventing slipping.

The lower bifurcated ear 30, has pivoted thereto the end of a rod 23, by the pin 24. The rear end of said rod 23, passes through a hole formed in a lug 25, which projects downward from a clamp 26, secured to the spring 2, of the vehicle; and the end of said rod 23, is threaded and provided with a nut 27, and cotter pin 28; while between said nut 27, and the lug 25, is placed on the rod 23, a compensating spring 29, which compensates for the variations in the distance between the clamp 26, and the pivot point of the spring 2, curved by the movement of said spring 2.

Having thus described my invention what I claim as new and desire to secure by Letters Patent is:—

In an automobile buffer of the class described, the combination with a buffer-bar of impact cushioning arms secured to said buffer-bar, said arms being formed of telescoping members, a head formed on the end of one of said members and adapted to rest against the end of the vehicle frame, bifurcated ears formed on said head and clamping arms pivoted in said ears, one of said clamping arms being adapted to be secured to the vehicle frame in a rigid manner and the other arm adapted to be secured to the spring of said vehicle in an adjustable manner.

In testimony whereof I affix my signature in presence of two witnesses.

FREDERICK C. FEHRMAN.

Witnesses:
 JOHN J. THOMPSON,
 WM. J. COULTER.